United States Patent [19]
Ohtomo et al.

[11] Patent Number: 5,708,748
[45] Date of Patent: Jan. 13, 1998

[54] TARGET DEVICE FOR A LASER

[75] Inventors: Fumio Ohtomo; Kunihiro Hayashi, both of Tokyo, Japan

[73] Assignee: Kabushiki Kaisha TOPCON, Tokyo, Japan

[21] Appl. No.: 592,384

[22] PCT Filed: Dec. 27, 1994

[86] PCT No.: PCT/JP94/02272

§ 371 Date: Feb. 1, 1996

§ 102(e) Date: Feb. 1, 1996

[30] Foreign Application Priority Data

Jul. 2, 1994 [JP] Japan .................................. 6-173197

[51] Int. Cl.⁶ ...................................................... G02B 6/04
[52] U.S. Cl. .......................... 385/120; 385/115; 385/901; 362/32
[58] Field of Search .................................. 385/120, 115, 385/121, 901; 362/32, 31

[56] References Cited

U.S. PATENT DOCUMENTS 4,141,058  2/1979  Mizohata et al. .................. 362/32

*Primary Examiner*—Phan T. H. Palmer
*Attorney, Agent, or Firm*—Brumbaugh, Graves, Donohue & Raymond

[57] ABSTRACT

The present invention relates to a target device for laser and particularly aims at providing a target device for laser provided with a plurality of fiber members, using at least one face as a diffusing surface and thereby capable of improving visibility at a light place. In the present invention, a diffusing member transmits and diffuses visible light, a transmitting plate transmits the visible light, and an optical member is formed on at least one face side of the transmitting plate, the optical member comprising a plurality of fiber members which are arranged so that their longitudinal directions are approximately parallel to each other. Consequently, the passing position of light can be represented on a diffusing plate, and the light which has passed through the target device is influenced by diffusion and becomes no longer glaring, whereby the visibility can be improved even at a light place.

13 Claims, 8 Drawing Sheets

TARGET DEVICE FOR A LASER

TECHNICAL FIELD

The present invention relates to a target device for a laser and more particularly a target device for a laser equipped with a plurality of fiber members and capable of improving visibility in a light place by using at least one surface as a diffusing surface.

BACKGROUND ART

Generally, in an installing work for sewer pipes or the like, the ground is dug down and hollow pipes, etc. are installed. Since liquids such as city water and sewage are flowed down through such hollow pipes, it is necessary that the hollow pipes be inclined to an appropriate extent. In particular, when the hollow pipes bend vertically and meander right and left in intermediate positions, there has been a fear that the contents flowing down through the pipes may stay and block the pipe or lead out into the ground.

Therefore, in installing such pipes, it has so far been necessary to measure the installing pipe depth at every certain distance and provide an appropriate reference line so as to dig down the ground to predetermined depths.

Reference will now be made to a concrete method for execution. First, laser light is radiated as guide between certain straight lines and with the laser light as a reference there is installed a general, temporary base. On the temporary base thus installed are then put pipes so as to be coincident with each other with respect to direction, inclination and the inner lower surfaces. Thereafter, the dug portion of the ground is filled up and now the work is over.

In the above work, laser light is effective in positioning the pipes; besides, unlike yarn, laser light does not become loose even over a long distance, nor does it interfere with the work. Further, there is no fear of laser light being broken by interference with the pipes, etc. during the work.

As mentioned above, in the case where the pipe laying work is carried out using laser light as guide, the laser light is passed through the center of the pipe. For effecting alignment of the laser light and the pipes there are used various targets.

For example, as shown in FIG. 7, a target device is composed of a target plate 10000 and target bases 20000 and 20100 for resting the target plate 10000 thereon. The target plate 10000 is for receiving laser light and is constructed so as to diffuse the laser light upon incidence of the light. Laser light has directivity and is extremely difficult to be seen with the eyes, but once diffused, it becomes visible easily to the worker.

When a pipe laid position is to be checked by using such a target device and in the case of laying the first pipe, the pipe position can be observed from the laser oscillator side, but usually in most cases the laser light passing diffusedly through the target device mounted at a pipe end portion is observed.

As the material of the target plate 10000, therefore, there is used an opaque material which not only diffuses but also somewhat transmits laser light.

In most cases, however, a pipe laying work, especially a work of burying pipes of a small diameter into the ground, is performed in the light daytime. In this connection, with the target plate 10000 of the conventional target device, as shown in FIG. 8, it is possible to check the pipe from any position because of uniform diffusion of light, but there arises the problem that in a light place it is difficult to check the pipe.

DISCLOSURE OF THE INVENTION

The present invention comprises a target device for a beam of laser light having an axis of propagation, comprising a row of substantially parallel elongated optical members, each optical member having an axis of elongation and an outer surface shaped to refract light in a direction generally perpendicular to the axis of elongation, and the axis of elongation being transverse to the axis of propagation of the beam of laser light, whereby the beam of laser light, on passing through one or more optical members, is expanded in a direction generally perpendicular to both the axis of elongation and the axis of propagation.

Moreover, the present invention comprises a diffusing plate formed by a diffusing member for transmitting and diffusing visible light, a transmitting plate for transmitting the visible light, and an optical member formed at least on one face side of the transmitting plate, the said optical member comprising a plurality of fiber members arranged so that their longitudinal directions are approximately parallel to each other.

Further, the present invention comprises a diffusing plate formed by a diffusing member for transmitting and diffusing visible light, a transmitting plate constituted by a molding member of a different refractive index for transmitting the visible light, and an optical member formed in the said transmitting plate, the said optical member comprising a plurality of fiber members arranged so that their longitudinal directions are approximately parallel to each other.

Additionally, the present invention comprises a diffusing plate formed by a diffusing member for transmitting and diffusing visible light, a first transmitting plate for transmitting the visible light, a second transmitting plate for transmitting the visible light, and an optical member formed between the first and second transmitting plates, the said optical member comprising a plurality of fiber members arranged so that their longitudinal directions are approximately parallel to each other.

In the present invention, the magnification of visible light can be changed by adjusting the spacing between adjacent fiber members.

In the present invention, the plural fibers members may be constituted by a fiber sheet.

In the present invention, the fiber members may each be substituted by a columnar optical member of a non-circular section.

In the present invention, the fiber members may each be substituted by a cylindrical lens.

In the present invention, the diffusing plate and the transmitting plate may be formed integrally with each other.

In the present invention, the diffusing plate formed by a diffusing member may be substituted by a sheet member formed by a diffusing member, which sheet member may be formed separately from or integrally with the transmitting plate.

In the present invention, the diffusing plate formed by a diffusing member may be substituted by at least one face of the transmitting plate which face is formed as a diffusing surface.

Further, the present invention is a target device for a rotational radiation type laser system, wherein a reflecting mirror may be formed at the back of the target device.

BRIEF DESCRIPTION OF THE DRAWINGS

The drawings illustrate embodiments of the present invention, in which.

BEST MODE FOR CARRYING OUT THE INVENTION

A target device 1000 embodying the present invention will be described below.

Before explaining the target device 1000, reference will first be made to a laser collimator 2000 which radiates laser light to the target device 1000.

Figure 9:
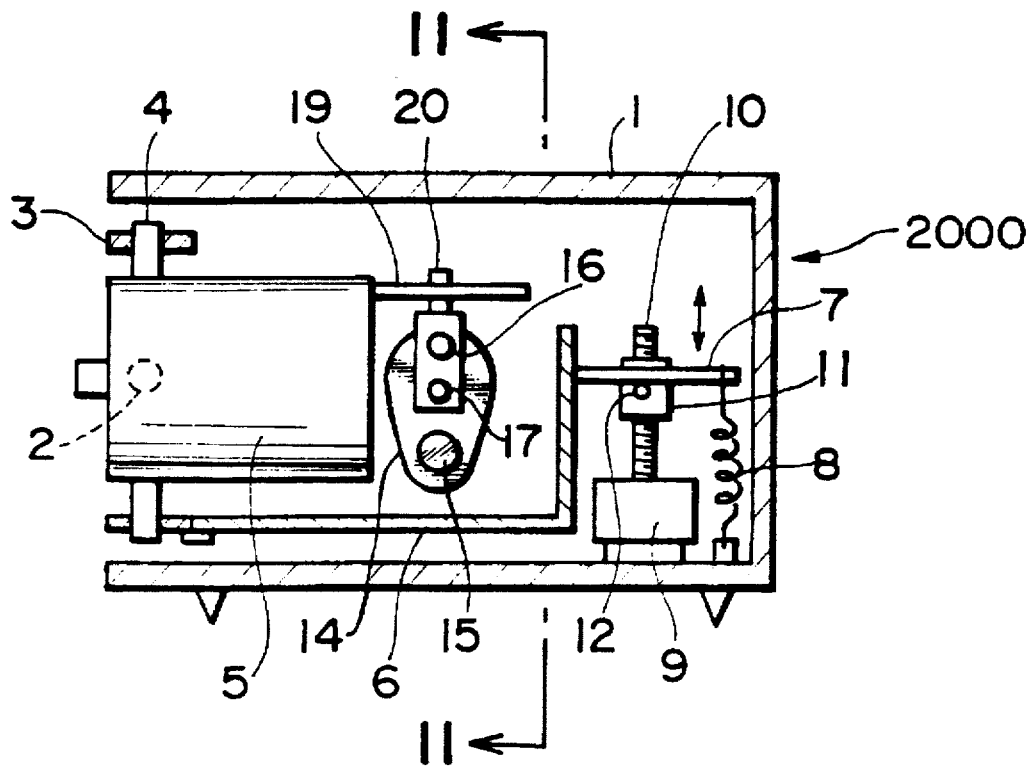
FIG. 9 is a view illustrating a laser collimator 2000.
Figure 10:
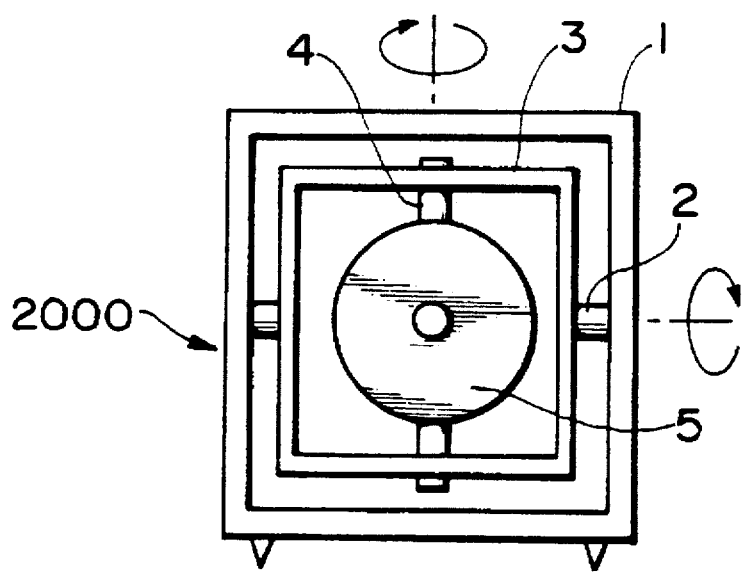
FIG. 10 is a view illustrating the laser collimator 2000.
Figure 11:
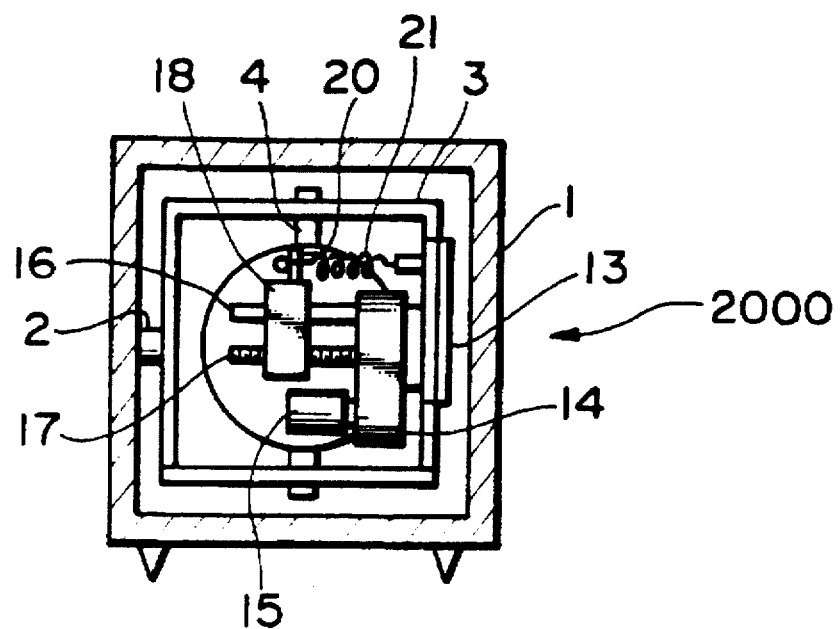
FIG. 11 is a view illustrating the laser collimator 2000.

As shown in FIGS. 9 and 11, the laser collimator 2000 comprises a frame 1, an elevation frame 3 mounted rotatably about a horizontal elevation shaft 2 which is formed near the front end of the frame 1, and a laser oscillator 5 formed pivotably about a pivot shaft 4 which is mounted in the vertical direction with respect to the elevation frame 3.

At the lower side portion of the elevation frame 3 is formed a horizontal, auxiliary frame 6 which faces backward, with a horizontal pin 7 being formed on the frame 6. The pin 7 is connected to the frame 1 through a spring 8 and it urges the elevation frame 3 clockwise in FIG. 9 by virtue of a resilient restoring force of the spring 8.

An elevation screw 10 is mounted upright in a direction in which it intersects the pin 7 substantially perpendicularly, with a nut 11 threadedly engaged with the screw 10 being in engagement with a fixing pin 12 projecting from the nut 11. The elevation screw 10 is connected to an output shaft of an elevation motor 9 mounted on the frame 1, and the inclination of the elevation frame 3 can be varied with the driving force of the motor 9.

On a side portion of the frame 3 is formed a vertical, auxiliary frame 13, and a rocking motor 15 is mounted to the frame 13 through a gear box 14. Extending horizontally from the gear box 14 are a guide shaft 16 and a rocking screw 17, the rocking screw 17 being connected to an output shaft of the rocking motor 15. A nut block 18, which is threadedly engaged with the rocking screw 17, is slidably fitted on the guide shaft 16.

Projecting horizontally from the rear end portion of the laser oscillator 5 is a horizontal pin 19, which is in engagement with an engaging pin 20 formed in the nut block 18. Between the horizontal pin 19 and the vertical, auxiliary frame 13 is inserted a biasing spring 21. Under a resilient restoring force of the biasing spring 21 the laser oscillator 5 is urged horizontally, namely rightwards in FIG. 11.

The laser collimator 2000 constructed as above can be rotated in two perpendicularly intersecting directions by the operation of the elevation motor 9 and rocking motor 15.

The laser oscillator 5 is provided with a laser light emitting portion to emit laser light.

The target device 1000 of this embodiment will be described below with reference to FIG. 1.

The target device 1000 of this embodiment comprises a target plate 100 and target bases 200, 210 for mounting the target plate 100 thereon. The target plate 100 is composed of a target plate body 101 and a diffusing plate 102, and it receives laser light emitted from the laser collimator 2000.

The target plate 100 used in this embodiment will be described below in detail.

[First Embodiment]

A first embodiment of the target plate 100 will now be described with reference to FIG. 2. The target plate 100 of the first embodiment comprises a diffusing plate 102, a transmitting plate 110 and a plurality of fiber members 120, 120, . . . .

The diffusing plate 102 is formed by a diffusing member for the transmission and diffusion of visible light.

The transmitting plate 110 is for the transmission of visible light.

The plural fiber members 120, 120, . . . , which correspond to optical members, are arranged at least on one face side of the transmitting plate 110 in such a manner that their longitudinal directions are approximately parallel to one another.

The diffusing plate 102 may be disposed on any side of the transmitting plate 110.

Figure 2:
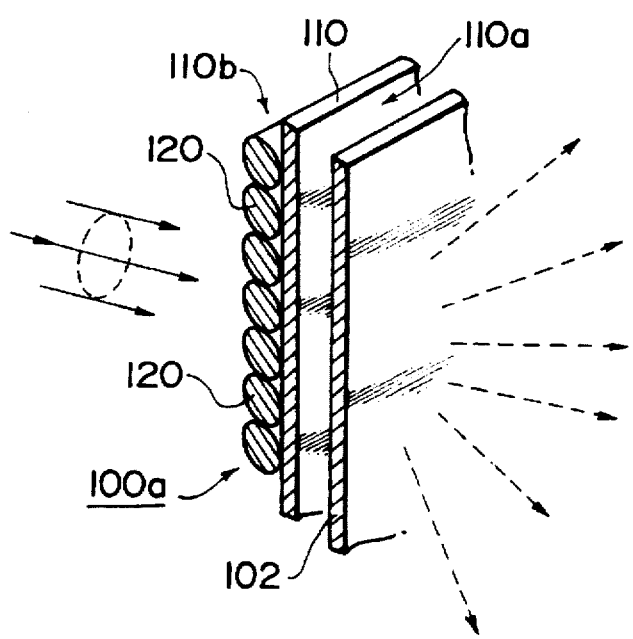
FIG. 2 is a view illustrating the construction of a target plate 100a in a first embodiment.

In the target plate, indicated at 100a, of the first embodiment shown in FIG. 2, light may be introduced from either the visible light transmitting plate 110 or the diffusing plate 102.

Figure 3A:
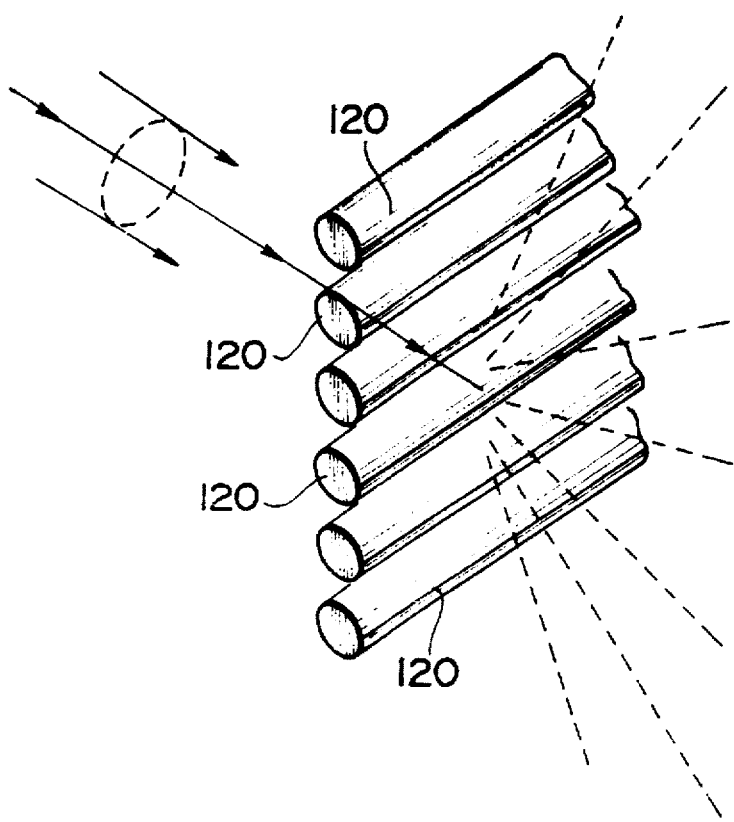
FIG. 3(a) is a view illustrating the operation of plural fiber members 120, 120, . . .
Figure 3B:
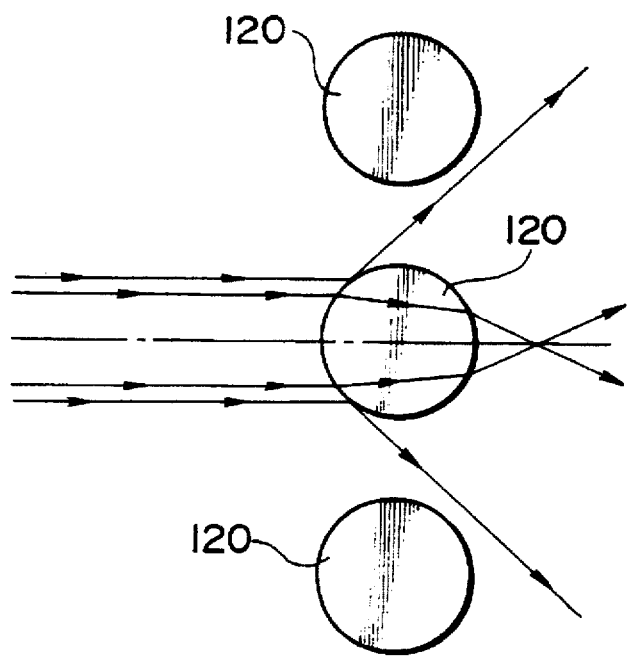
FIG. 3(b) is a view illustrating the operation of plural fiber members 120, 120, . . .

Description is now directed to laser light which is incident on the plural fiber members 120, 120, . . . , with reference to FIGS. 3(a) and 3(b). The light which passes through each fiber member 120 is not expanded in the longitudinal direction of the fiber member, but is expanded in the direction orthogonal to the longitudinal direction, and in the said direction the light can be checked from any angle.

FIG. 3(b) is an enlarged view of plural fiber members 120, 120, . . . . In the incident light are present both light which passes through a fiber member 120 and light which is reflected by the surface of the fiber member. Thus, since the light reflected by the fiber member surface is added to the light passing through the fiber member, it is possible to expand the incident light to a greater extent. In the case where the fibers members are molded, the expansion of the light depends on the difference in refractive index.

Figure 1:
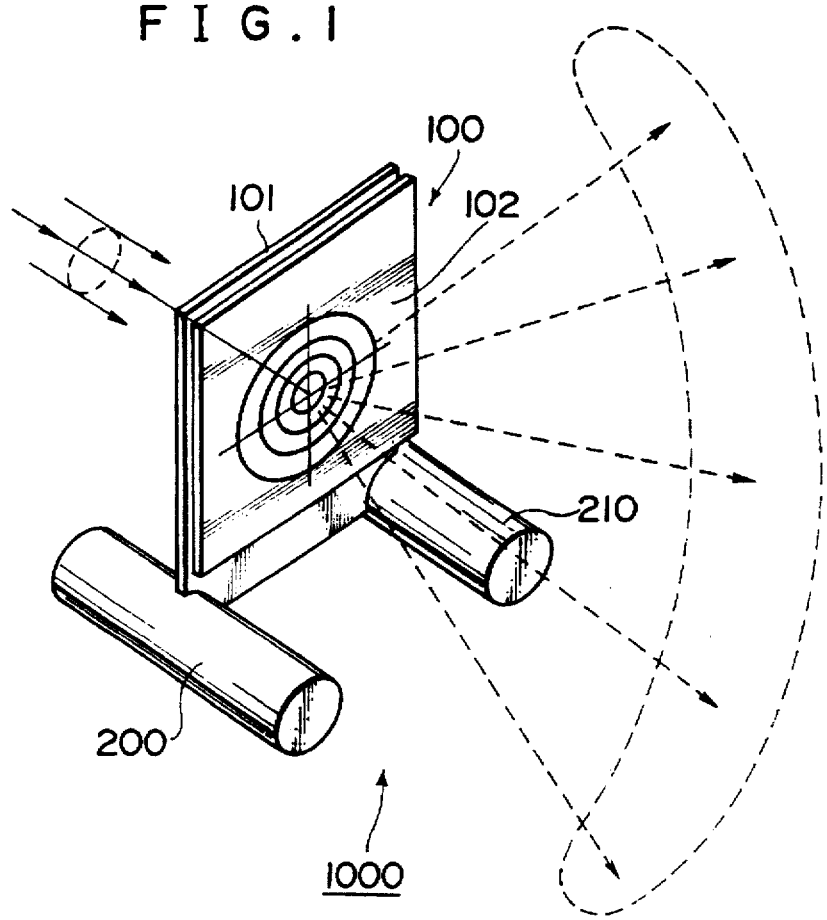
FIG. 1 is a view showing a construction embodying the invention.

Since the diffusing surface diffuses the passing light, the passing position of the light is represented on the diffusing plate, and under the influence of the diffusion the light which has passed through the target plate becomes substantially elliptical as in FIG. 1 and thus can be seen more easily also in the longitudinal direction.

In the case where the diffusing surface is positioned before or behind the plural fiber members 120, 120, the light passing position is likewise represented on the diffusion plate and the light which has been expanded in a certain specific position is influenced by diffusion and assumes such an elliptic shape as in FIG. 1.

In this first embodiment the diffusing plate 102 and the transmitting plate 110 may be rendered integral with each other. There also may be adopted a construction wherein the diffusing plate 102 is omitted and one side 110a of the transmitting plate 110 is formed as a visible light transmitting surface, while the other side 110b is formed as a light diffusing surface. On the diffusing surface 110b there may be arranged plural fiber members 120, 120, ... so that their longitudinal directions are parallel to one another.

Alternatively, the plural fibers 120, 120, ... may be arranged on the visible light transmitting surface 110a.

As the plural fiber members 120, 120, ... there may be used fibers which are employed in optical transmission for example, or a fiber sheet may be used. In place of the fiber members 120 there may be used columnar optical members such as, for example, columnar lenses of a non-circular section.

By changing the spacing between adjacent fibers members 120 it is made possible to adjust the amount of transmitting light and that of expanded light.

Further, the fibers members 120 may be substituted by cylindrical lenses.

[Second Embodiment]

Figure 4:
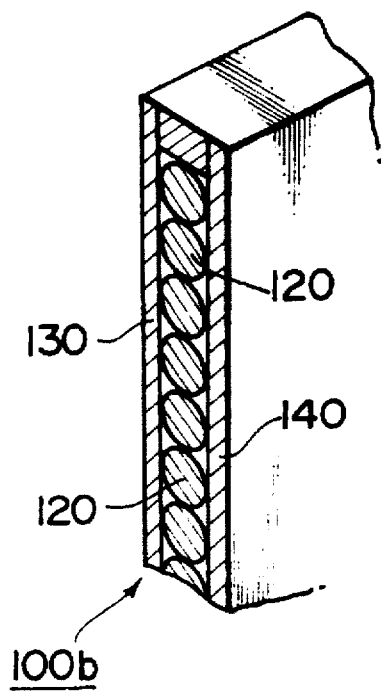
FIG. 4 is a view illustrating the construction of a target plate 100b in a second embodiment.

A second embodiment of the target plate 100 will now be described with reference to FIG. 4. The target plate, indicated at 100b, of the second embodiment comprises a first transmitting plate 130 for transmitting visible light, a second transmitting plate 140 for transmitting visible light, and a plurality of fiber members 120, 120, ... formed between the first and second transmitting plates 130, 140.

At least one side of either the first transmitting plate 130 or the second transmitting plate 140 serves as a diffusing surface. The diffusing surface may be the inside surface or the outside surface of the first transmitting plate 130, and it may be the inside surface or the outside surface of the second transmitting plate 140.

Also with the target plate 100b of the second embodiment constructed as above, the light passing position is represented on the diffusing surface and the light which has been expanded in the direction orthogonal to the longitudinal direction is no longer glaring but is diffused into an elliptical shape.

Although in this second embodiment at least one side of either the first transmitting plate 130 or the second transmitting plate 140 is used as a diffusing surface and the diffusing surface is integral with either the first or the second transmitting plate, there may be adopted a construction wherein the diffusing surface is formed by a suitable plate- or sheet-like diffusing member, and the diffusing member, e.g. a diffusing plate, is formed separately from either the first transmitting plate 130 or the second transmitting plate 140.

As to the other constructional points, etc., they are the same as those of the target plate 100a of the first embodiment, so explanations thereof are here omitted.

[Third Embodiment]

Figure 5:
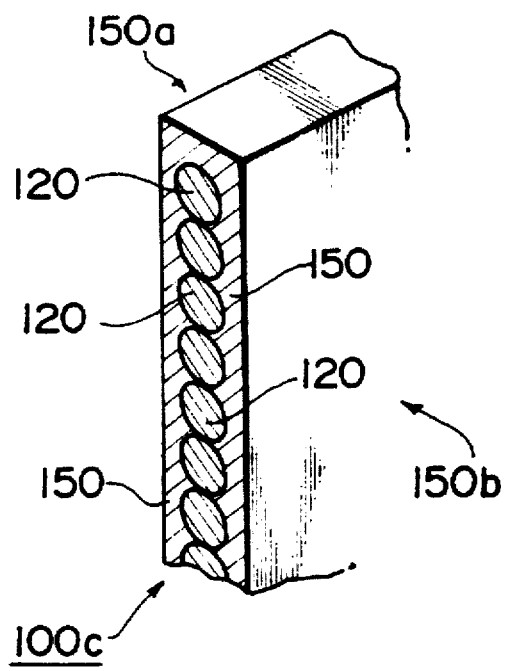
FIG. 5 is a view illustrating the construction of a target plate 100c in a third embodiment.

A third embodiment of the target plate 100 will now be described with reference to FIG. 5. In the target plate, indicated at 100c, of the third embodiment, a plurality of fiber members 120, 120, ... are molded.

The target plate 100c of the third embodiment comprises a molding member body 150 and a plurality of fiber members 120, 120, ... formed within the molding member body 150 and arranged in the same direction.

One side of the molding member body 150 serves as a first surface 150a which transmits visible light, and the other side thereof serves as a second surface 150b which also transmits visible light. Either the first surface 150a or the second surface 150b serves as a diffusing surface.

It is necessary that the material of the molding member body 150 and that of the fiber members 120 be different in refractive index. If both are of the same refractive index, the laser light will merely pass through them. Further, the reflection efficiency can be adjusted by adjusting the refractive index of the molding member body 150 and that of the fiber members 120. Generally, the reflection efficiency is improved when the refractive index of the molding member body 150 is higher than that of the fiber members 120.

Also with the target plate 100c of the third embodiment constructed as above, the light passing position is represented on the diffusing surface and the light which has been expanded in a certain specific direction is no longer glaring and is diffused into an elliptical shape.

Although in the third embodiment either the first surface 150a or the second surface 150b serves as a diffusing surface and the diffusing surface is integral with the molding member body 150, there may be adopted a construction wherein the diffusing surface is formed by a suitable plate- or sheet-like diffusing member, and the diffusing member is formed separately from either the first surface 150a or the second surface 150b.

As to the other constructional points, etc., they are the same as those of the target plate 100a of the first embodiment and therefore explanations thereof are here omitted.

Thus, the target device 1000 is constituted by mounting the target plate 100 exemplified above as the first to the third embodiments onto the target bases 200 and 210.

In the case of a pipe work, once the target device 1000 is installed on the bottom of pipe interior and receives laser light from the laser collimator 2000, it is possible to set a reference line accurately and hence possible to effect the positioning of pipe with a high accuracy.

The following description is now provided about an example of application to a rotational radiation type laser system wherein scanning is performed in the target position.

First, an outline of the rotational radiation type laser system, indicated at 3000, will be explained below.

The rotational radiation type laser system 3000 comprises a collimator lens, an inclination angle compensating system, a reflecting mirror, a beam expander, a mirror for conducting reflected light from a target to a photodetector, the photodetector, and a beam rotating system, which components are arranged on the optical axis of laser light emitted from the laser light source.

In the rotational radiation type laser system 3000, therefore, laser light is rotated about a vertical line and a horizontal reference plane can be formed thereby. If there is used a target having a reflecting surface, it is possible to determine the position of a reference line, reference plane, etc. by controlling the rotation of the laser system 3000 and effecting scanning. The target commonly used for the rotational radiation type laser system 3000 is constituted by such a reflecting member 60 as shown in FIG. 12. The reflecting member 60 is formed with two vertical reflection zones 62 and 64.

The laser system 3000 searches the two vertical reflection zones 62 and 64 of the reflecting member 60 to obtain a double pulse signal. With the double pulse signal the laser system 3000 can judge whether the reflective object is the target or an unnecessary object.

The following description is now provided about the case where the target device 100 of this embodiment is applied to the rotational radiation type laser system 3000.

Figure 6:
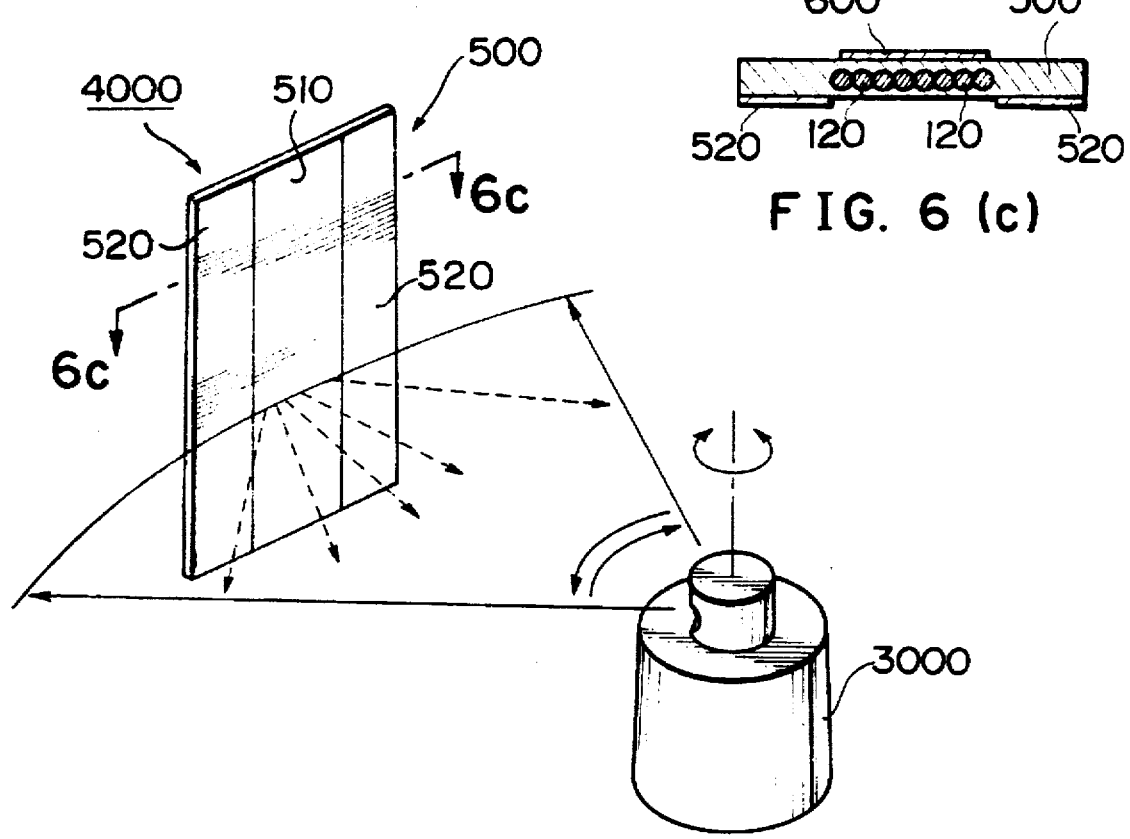
FIG. 6(a) is a view illustrating a target 4000 for a rotational radiation type laser system.
FIG. 6(b) is a view illustrating the target 4000.
FIG. 6(c) is a cross section of FIG. 6(a) along 6c—6c.
Figure 6B:
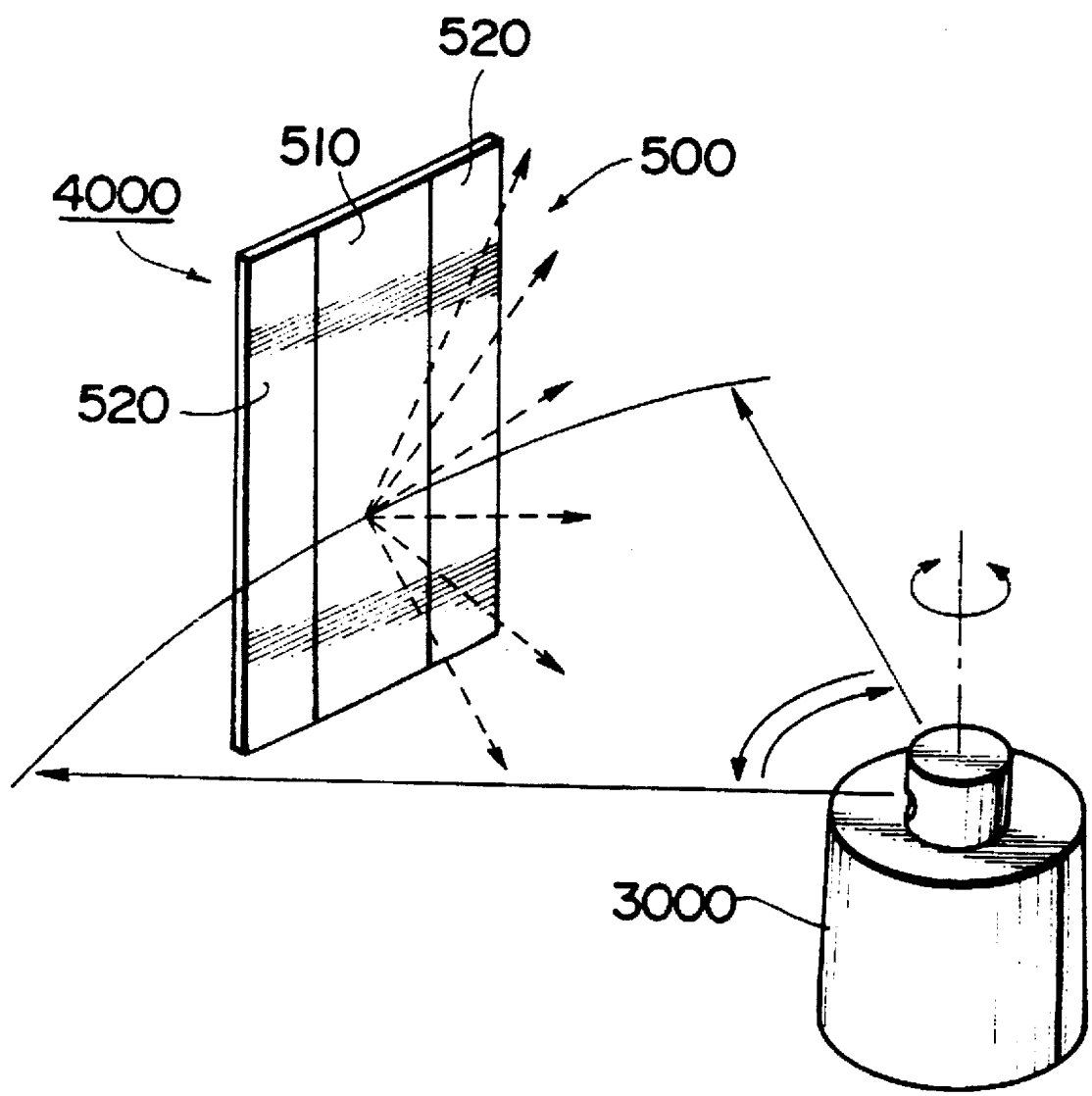
Figure 7:
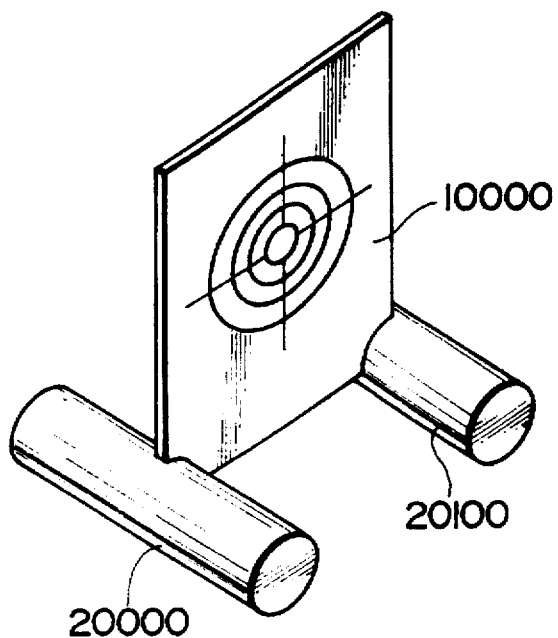
FIG. 7 is a view illustrating the prior art.
Figure 8:
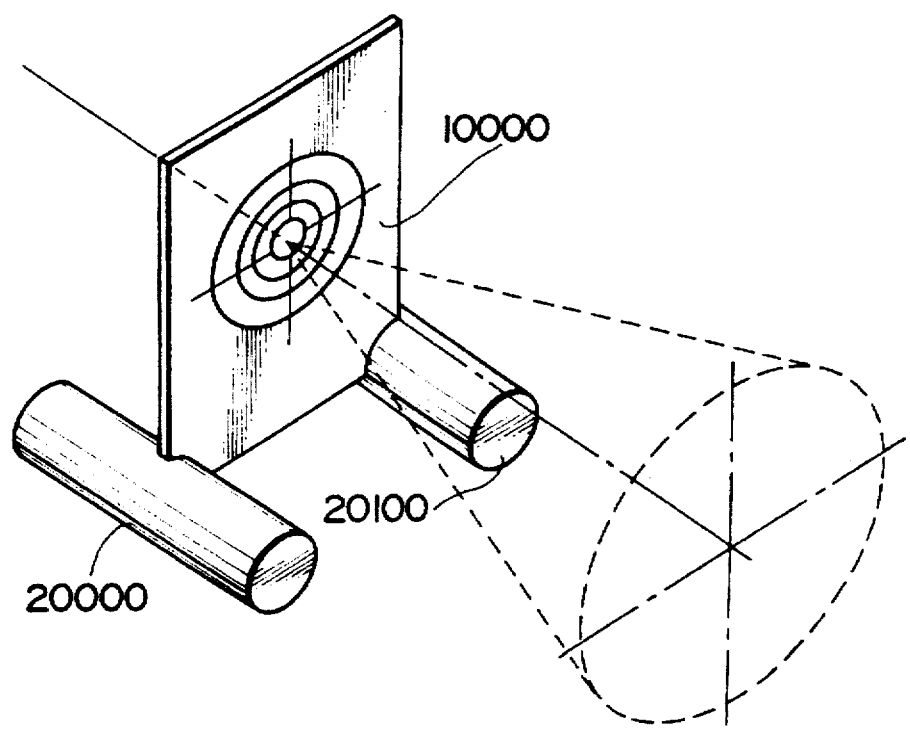
FIG. 8 is a view illustrating the prior art.

As shown in FIGS. 6(a) and 6(b), a target 4000 for the rotational radiation type laser system comprises a target plate body 500 and a mirror portion 600 formed on the back of the target plate body 500.

In the target plate body 500 is centrally formed a laser light inlet portion 510, and on both sides of the laser light inlet portion 510 are formed laser light reflecting portions 520, 520.

The laser light inlet portion 510 is constituted by a plate member which transmits visible light, with a mirror portion 600 being formed on the back of the laser light inlet portion.

Within the laser light inlet portion 510 are arranged a plurality of fiber members 120, 120, ... vertically in parallel with one another. In this embodiment, those fiber members are formed by molding.

Further, the whole surface of the laser inlet portion 510 serve as a diffusing surface.

The target 4000 for the rotational radiation type laser system constructed as above is adapted to be observed by the user from this side in FIGS. 6(a) and 6(b). Laser light which has entered the laser light inlet portion 510 is reflected by the mirror portion 600 formed on the back of the inlet portion, and the reflected laser light is expanded in the scanning direction.

As shown in FIGS. 6(a) and 6(b), a suitable reflecting direction can be determined.

According to the present invention thus constructed, a diffusing member transmits and diffuses visible light, while an optical member expands the visible light uniaxially.

According to the present invention, moreover, a diffusing member transmits and diffuses visible light, while an optical member expands the visible light uniaxially, the optical member comprising a plurality of fiber members which are arranged so that their longitudinal directions are approximately in parallel with each other.

Further, according to the present invention, a diffusing member transmits and diffuses visible light, a transmitting plate transmits the visible light, and an optical member is formed at least on one face side of the transmitting plate, the optical member comprising a plurality of fiber members arranged so that their longitudinal directions are approximately parallel to each other.

According to the present invention, moreover, a diffusing plate formed by a diffusing member transmits and diffuses visible light, a diffusing plate formed by a molding member of a different refractive index transmits the visible light, and an optical member is formed within the transmitting plate, the optical member comprising a plurality of fiber members arranged so that their longitudinal directions are substantially parallel to each other.

Further, according to the present invention, a diffusing plate formed by a diffusing member transmits and diffuses visible light, a first transmitting plate transmits visible light, a second transmitting plate transmits the visible light, and an optical member is formed between the first and second transmitting plates, the optical member comprising a plurality of fiber members arranged so that their longitudinal directions are substantially parallel to each other.

According to the present invention, moreover, a fiber spacing adjusting means can adjust the spacing between adjacent fiber members, whereby the expansion of visible light can be varied.

The plural fiber members used in the present invention may be substituted by a fiber sheet.

Further, the fiber members used in the invention may each be replaced with a columnar optical member of a non-circular section.

In the present invention, moreover, cylindrical lenses may be used in place of the fiber members.

In the present invention, the diffusing plate may be formed integrally with the transmitting plate.

Further, in the present invention, the diffusing plate formed by a diffusing member may be substituted by a sheet member formed by a diffusing member, and the sheet member may be separate from or integral with the transmitting plate.

In the present invention, moreover, at least one face of the transmitting plate may be used as a diffusing surface in place of the diffusing plate formed by a diffusing member.

Further, a target for a rotational radiation type laser system according to the present invention includes a reflecting mirror formed on the back of a target device for laser.

According to the present invention constructed as above, since a diffusing member transmits and diffuses visible light, a transmitting plate transmits visible light, and an optical member is formed at least on one face side of the transmitting plate, the optical member comprising a plurality of fiber members, the passing position of light is represented on the diffusing plate, the light which has passed through the target device is no longer glaring under the influence of diffusion, and thus the visibility is improved even at a light place.

According to another effect of the present invention, since the fiber members used are flexible, they can be sandwiched easily in between plate members such as the diffusing plate, and the molding operation can be done easily.

According to a further excellent effect of the present invention, due to the combination of fiber members and diffusing plate, the passing position of light is represented on the diffusing plate, the laser light from the fiber members is diffused moderately, so the visibility is improved even at a light place, and the light which has passed through the target device is not glaring.

Industrial Applicability

As set forth hereinabove, the present invention concerns a target device for laser which is provided with a plurality of fiber members and in which one face is used a diffusing surface, thereby permitting improvement of visibility even at a light place. According to this target device, the passing position of light is represented on the diffusing plate, and the light which has passed the target device is influenced by the diffusion and becomes no longer glaring, so the visibility is improved even at a light place. This target device for laser is best suited for a sewer pipe laying work or the like.

What is claimed is:

1. A target device for a beam of laser light having an axis of propagation, comprising a row of substantially parallel elongated optical members, each optical member having an axis of elongation and an outer surface shaped to refract light in a direction generally perpendicular to the axis of elongation, and the axis of elongation being transverse to the axis of propagation of the beam of laser light, whereby the beam of laser light, on passing through one or more optical members, is expanded in a direction generally perpendicular to both the axis of elongation and the axis of propagation.

2. The target device of claim 1, further comprising a planar transparent member for transmitting visible light positioned on at least one side of the row of optical members.

3. The target device of claim 1, further comprising two parallel transparent plates for transmitting visible light with the row of optical members positioned between the two plates.

4. The target device of claim 3, further comprising a diffusing sheet between the two transparent plates.

5. The target device of claim 1, further comprising a transparent plate for transmitting visible light having a first refractive index, and the row of optical members being molded within the transparent plate and having a second refractive index different than the first refractive index.

6. The target device of claim 5, in which the first refractive index is greater than the second refractive index.

7. The target device of claims 2, 3, or 5, further comprising a planar diffusing member on at least one face of the transparent plate.

8. The target device of claim 1, in which the optical members are cylindrical lenses.

9. The target device of claim 1, in which the optical members are columnar lenses of non-circular cross-section.

10. The target device of claim 1, in which the optical members are part of an optical fiber sheet.

11. The target device of claim 1, further comprising a planar diffusing member for diffusing visible light positioned on at least one side of the row of optical members.

12. The target device of claim 1, further comprising a reflecting mirror positioned on the side of the row of optical members opposite the side on which the beam of laser light is incident on the optical members.

13. The target device of claim 1, in which the optical members are optical fibers.

\* \* \* \* \*

UNITED STATES PATENT AND TRADEMARK OFFICE
CERTIFICATE OF CORRECTION

PATENT NO. : 5,708,748
DATED : January 13, 1998
INVENTOR(S) : Ohtomo et al.

Figures 12A, 12B:
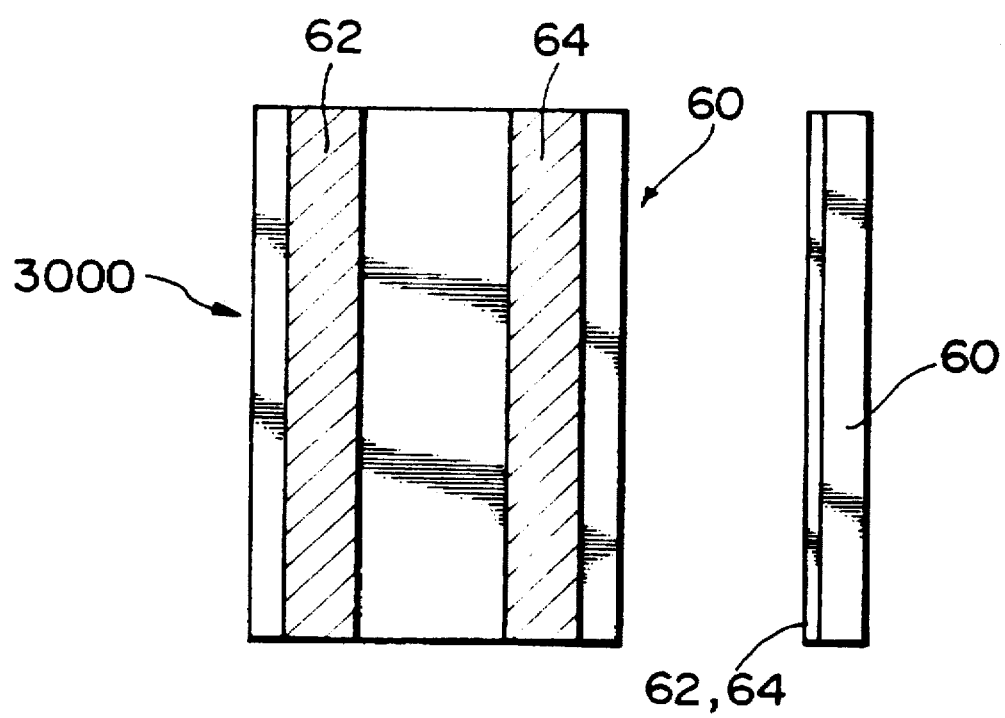
FIG. 12 is a view illustrating a conventional target for a rotational radiation type laser system 3000.

It is certified that error appears in the above-indentified patent and that said Letters Patent is hereby corrected as shown below:

Column 3, line 16, "FIG. 6(c) is a cross section of FIG. 6(a) along 6c-6c;" should read --FIG. 6(c) is a sectional view of an embodiment of a target device according to the present invention taken along line 6c-6c of FIG. 6(a);--;

Column 3, lines 22-23, "FIG. 11 is a view illustrating the laser collimator 2000; and" should read --FIG. 11 is a sectional view of an embodiment of a collimator according to the present invention taken along line 11-11 of FIG. 9;--;

Column 3, line 24, "FIG. 12" should read --FIG. 12(a)--;

Column 3, line 25, "3000." should read --; and
    FIG. 12(b) is a side view of a conventional target for a rotational radiation type laser system.--.

UNITED STATES PATENT AND TRADEMARK OFFICE
CERTIFICATE OF CORRECTION

PATENT NO. : 5,708,748
DATED : January 13, 1998
INVENTOR(S) : Ohtomo et al.

It is certified that error appears in the above-indentified patent and that said Letters Patent is hereby corrected as shown below:

Column 6, line 65, "FIG. 12" should read --FIGS. 12(a) and 12(b)--;

Column 7, line 9, "6(a) and 6(b)" should read --6(a), 6(b) and 6(c),--;

Column 7, line 28, "6(a) and 6(b)" should read --6(a), 6(b), and 6(c)--;

Column 7, line 33, "6(a) and 6(b)" should read --6(a), 6(b), and 6(c)--.

Signed and Sealed this

Twenty-fifth Day of August, 1998

Attest:

BRUCE LEHMAN

Attesting Officer

Commissioner of Patents and Trademarks